June 30, 1931.   A. C. WISNER ET AL   1,812,128
WHEEL UNIT
Filed Oct. 2, 1930   2 Sheets-Sheet 1
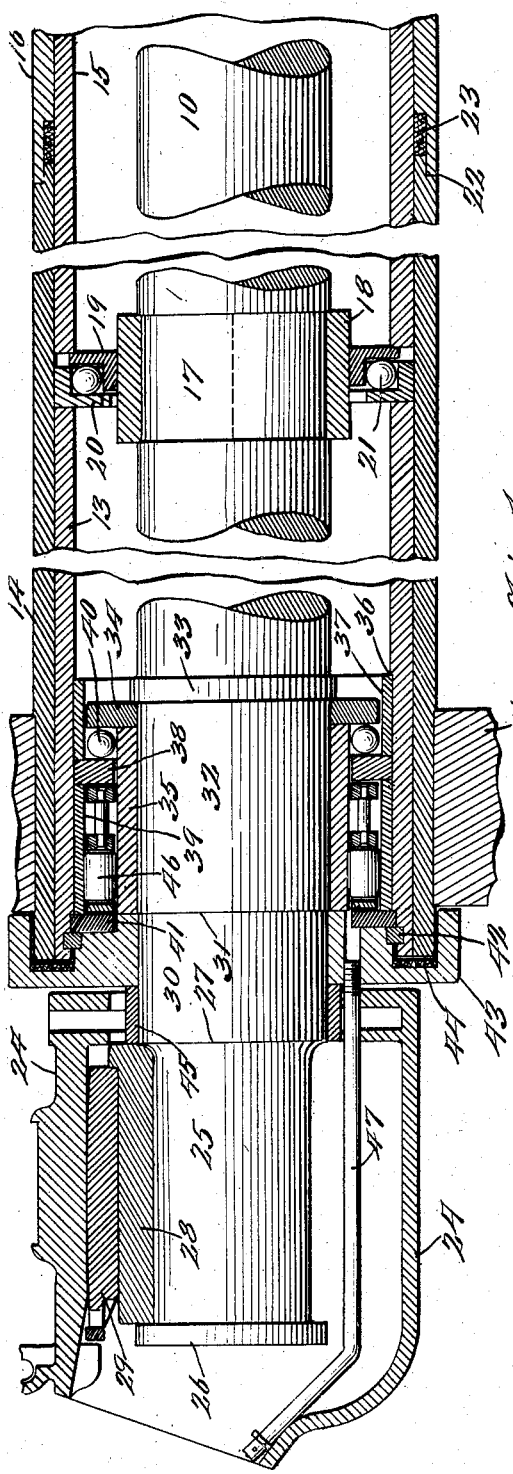
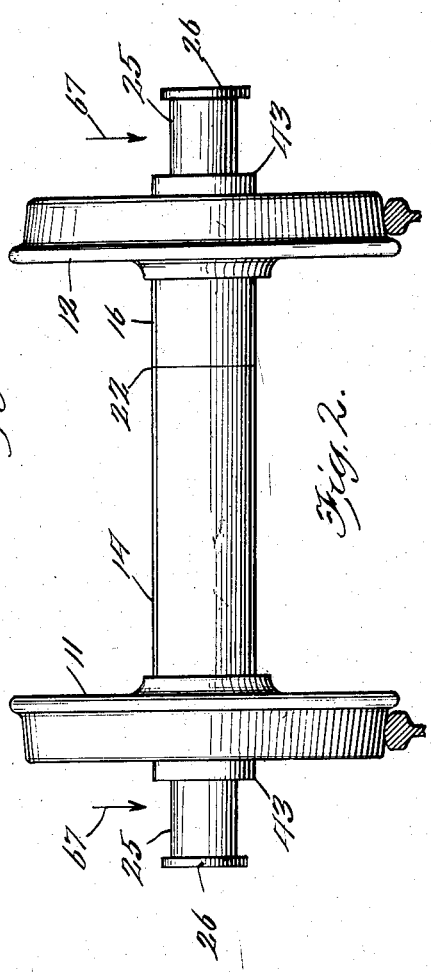
Inventors:
Abram C. Wisner
Casper L. Redfield
By Casper L. Redfield
Atty.

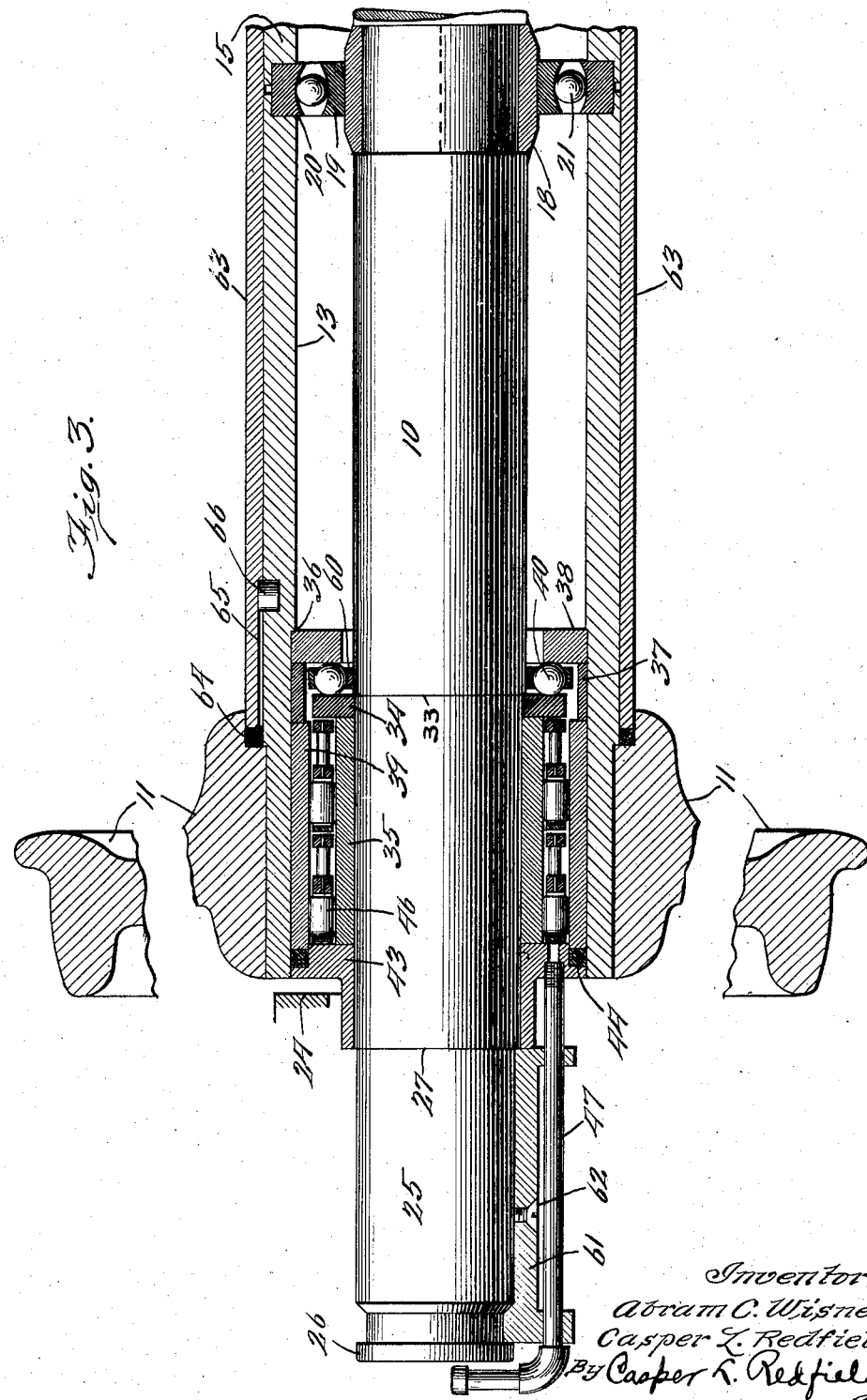

Patented June 30, 1931

1,812,128

UNITED STATES PATENT OFFICE

ABRAM C. WISNER, OF JACKSON, MICHIGAN, AND CASPER L. REDFIELD, OF CHICAGO, ILLINOIS

WHEEL UNIT

Application filed October 2, 1930. Serial No. 485,909.

Our invention relates to wheel units suitable for use on freight and passenger railway cars, and may be considered as an improvement over our pending application, Serial No. 427,665, filed February 12, 1930.

The ordinary railway wheel unit consists of two wheels secured upon an axle, the ends of which axle project into bearing boxes carried in a car truck. One of the objects of the present invention is to produce a wheel unit of a superior type which will be interchangeable with the ordinary wheel unit without any modification of the standard box and truck beyond drilling a small hole for the passage of an oil pipe.

Another object is to provide separate rolling bearings for load-carrying and for axial thrust, and so arranged that the thrust bearings will be between the load-carrying bearings. The purpose of this is to bring the load-carrying bearings as near as possible to the points at which the load rests upon the axle.

Another object is to provide an outside stiffening tube or sleeve between the wheels, which tube will permit of a differential movement of the wheels, and which at the same time may act as a pulley, or may carry a pulley, for driving a motor.

Still other objects, including a novel means for oiling, and simplicity and convenience of construction, will appear in the description.

In the accompanying drawings

Fig. 1 is a longitudinal section of one end of our wheel unit, together with a section of a standard box, certain parts of the unit being broken away;

Fig. 2 is an elevation, at a reduced scale, of the complete unit shown in part in Fig. 1; and Fig. 3 is another form of the unit shown in Fig. 1.

In the said drawings there is an interior stationary axle 10, which corresponds in size and proportions to the rotating axle of an ordinary wheel unit, and an exterior tubular axle transversely divided into two parts, to the outer ends of which parts are secured the wheels 11 and 12. In Fig. 1, the left hand part of this tubular axle consists of pieces of tubing 13 and 14 which are secured solidly together by a shrink fit, spot welding, or in any other convenient manner. In the same way, the right hand part consists of pieces of tubing 15 and 16 similarly secured together. The left hand part may be made of a single tube, and the same is true of the right hand part. Making them in two layers is simply a matter of convenience.

At the center of its length, the axle 10 is turned down as shown at 17, and in this part of reduced diameter is a ring 18 made in two halves, and having an outer diameter greater than the diameter of the axle 10. Mounted on the ring 18 is the inner member 19 of a ball race, and located between the ends of the tubes 13 and 15 is the outer member 20 which has its outer face fitting loosely into the tube 14. Balls 21 are located between the members 19 and 20.

The inner tubes 13 and 15 are of the same length, but the tube 14 is longer than the tube 13 to which it is secured, whereas the tube 16 is shorter than the tube 15. As a consequence, the tube 14 overlaps a considerable length of the tube 15, and makes a joint 22 between parts 14 and 16. The parts 14 and 15 provide an overlapping joint and in this overlap is a packing 23.

While the parts 13 and 14 are secured solidly together, and the parts 15 and 16 are similarly secured, the parts 14 and 15 are a running fit thru the distance in which one overlaps the other. This is for the purpose of permitting one wheel to turn with respect to the other. The length of the overlap between 14 and 15 is preferably greater than the diameter of the tube 14, the purpose of this long overlap being to prevent any destructive action due to bending strain.

An ordinary railway truck box is shown at 24, and each end of the axle which projects into a box is turned down at 25 to leave a collar 26 and a shoulder 27. Between this collar and the shoulder is a casting 28, which corresponds to the ordinary brass, but is not lubricated, and between this casting and the upper part of the box 24 is the ordinary wedge 29. There is a part 30 of the axle between shoulders 27 and 31, and another part 32 between shoulder 31 and collar 33.

On each part 32 of the axle 10, are a hardened steel ring 34 and a hardened sleeve 35. These parts are preferably forced in place by hydraulic pressure, that is, they are forced fits on axle 10. The tube 13 is bored out so as to leave a slight shoulder 36, and in the enlarged part is inserted a ring 37. Next is a hardened steel ring 38 and a hardened bushing 39. The bushing is preferably a forced fit, but the rings 37 and 38 are not necessarily such. Between rings 34 and 38 are balls 40.

In contact with the end of the bushing 39, and fitting into the tube 13, is a hardened ring 41, and outside of this is a spring ring 42 which fits into a corresponding recess in the tube 13.

On the part 30 of axle 10, is a thrust ring 43 which encloses the parts last described and also contains packing 44 in contact with the ends of tubes 13 and 14. Between the thrust ring 43 and shoulder 27 is a small ring 45 which may be secured solidly in place in any convenient manner.

Between the sleeve 35 and the bushing 39, and enclosed by rings 34 and 41, is a cage containing a double row of hardened rollers 46. These rollers are preferably held in staggered relationship to each other in a manner well known in the art.

Within the box 24, and screwed into the ring 43, is an oil pipe 47. Oil inserted thru pipe 47 finds its way past the roller and ball bearings and into the large storage space between the inner and outer axles.

It is to be understood that the two ends of the device are the same, and that a description of one end is a description of the other end.

Fig. 3 illustrates another form of the same device. The same characters will be used as far as they are applicable, but different characters will be used when variations in details call for it. Except for details, the axle 10 is the same as before, and the same is true of the split ring 18 and the ball race mounted thereon.

The tubes 13 and 15 are the same as before except that they are made heavier and the wheels are secured directly to them. Between shoulders 33 and 27 on axle 10 are hardened ring 34, hardened sleeve 35 and thrust ring 43. None of these is necessarily a forced fit, tho there is some advantage in having the sleeve fit tightly on the axle.

The tube 13 is bored out as before, but rings 37 and 38 are transposed so that the ring 38 is on the opposite side of ring 34, that is, the ring 38 is nearer the center of the length of the device than is the ring 34. The balls are supported in a cage 60 between rings 34 and 38. The sleeve 35 and bushing 39 are as before, except that they are made twice as long so as to provide for double the number of rollers 46.

The thrust ring is smaller and has a boss extending to the shoulder 27, which boss serves the same purpose as ring 45 in Fig. 1. The packing 44 is shifted from the end of the tubular axle to the end of the sleeve 35, but operates in the same way.

On the lower part of the part 25 of axle 10, is a strut or filler 61 between collar 26 and shoulder 27, and this is held in place by a screw 62. This provides continuous metal from collar 26 to the shoulder 33, and prevents the displacement of the parts when the box 24 is not in position to furnish such strut by means of the casting 28. It is to be understood, of course, that the box 24 with casting 28 is to be used with the structure of Fig. 3, and that the filler 61 may be used with the structure of Fig. 1. The part 61 is provided with depending lugs as shown to serve as a support for the oil pipe 47.

Enclosing the tubes 13 and 15 of Fig. 3, is a tube 63, which is made of tubing and which extends from wheel to wheel, and has its ends extending into recesses formed in the hubs of the wheels over the tubes 13 and 15. In the recess of each wheel is a packing 64 which is engaged by the end of the tube as shown. In one end of the tube 63 is cut a keyway 65, and in the tube 13, but not in tube 15, is a pin or feather 66 which restrains the tube 63 to turn with tube 13 while permitting the tubes 63 and 15 to turn with respect to each other.

The tube 63 is an easy fit on the tubes 13 and 15, and because of its long bearing on the inner tubes, the fit does not need to be highly accurate. Making the tube 63 a separate piece and an easy fit, facilitates the assembling process.

The wheels rest upon rails as shown in Fig. 2, and the load rests upon the parts 25 of the axle 10. The strain of the load is represented by the arrows 67. The result of this load is to bend the axle 10 into a bow with the middle upward and the ends downward. But there is a ball bearing at the middle of the length of the axle 10, and this ball bearing is backed by the tubes of large diameter which are connected to the wheels. As the resistance of these tubes to bending is many times the resistance of the axle 10, the actual bending is reduced to a negligible quantity.

When a car is running on a track, it sways from side to side, and the strain due to such swaying must be conveyed thru the wheel unit to the rail toward which the swaying occurs. Referring to Fig. 1, when the car sways toward the right, the thrust is conveyed thru the box 24 at the left, and the parts 29 and 28 to the shoulder 27 of the axle 10, and then thru said axle to the other side. Or, if the casting 28 is loose in its seat, then the thrust is thru the ring 45 and thrust ring 43 to shoulder 31. Also, thru parts 35 and 34 to collar 33 on the axle.

Noting that the thrust goes always to the axle 10, it may be followed to the wheel by assuming that a thrust comes on the axle 10 from the right. This thrust is conveyed from collar 33 to ring 34, and then thru balls 40 to ring 38. It is then conveyed thru bushing 39, ring 41 and spring ring 42 to the tube 13, which tube is connected to the wheel by way of tube 14. It will thus be seen that a thrust coming from one side goes thru the axle 10 to the balls 40 on the other side, and then to the wheel adjacent to the balls which receive the thrust.

By referring to Fig. 3 it will be seen that the same result is obtained in a slightly different manner. In this case, the thrust goes thru parts 43, 35 and 34 to the balls 40, and then thru ring 38 to tube 13. From here it goes thru ring 20 to tube 15 on which is secured the wheel 12.

It will thus be seen that in Fig. 1, the thrust goes from one side to the other thru the stationary axle 10, whereas in Fig. 3, it goes from one side to the other thru the rotating tubular axle. In both cases, the thrust is transferred thru ball bearings from the stationary to the rotating parts.

In applying rolling bearings to freight and passenger cars on railways, it has been the practice to place roller bearings in the boxes on the trucks, and then have the axle turn in those bearings. In the present case we shift the roller bearings from inside of the box to inside of the wheel. In whichever place the rollers may be, it is essential that the bearings be capable of carrying very heavy loads at high speed and under pounding action continuously for considerable lengths of time. In Fig. 1 the requisite strength is obtained by running the rollers between sleeve and bushing forced in place. In Fig. 3 the requisite strength is obtained by making the bearings much longer. This is made possible by reason of the fact that the ball bearing at 21 maintains the inner and outer axles parallel with each other. As this central ball bearing is the same in both Fig. 1 and Fig. 3, it will be evident that the long or short bearing may be used indifferently at either place.

It will be noticed that roller bearings are used for load carrying at about the points where the wheels are located, and that ball bearings are used at other places because the strain is less at those other places. However, roller bearings may be used at those other places, and as a consequence, the term "rolling bearings" is used generically for either roller or ball bearings.

What we claim is:

1. A stationary axle having its ends adapted to enter the standard railway box without modification and to support the load resting on such boxes, a tubular axle transversely divided into two sections and surrounding the stationary axle between the parts which extend into the boxes, wheels secured to the outer ends of said sections, roller bearings inside of the hubs of the wheels and between the two axles, and rolling thrust bearings located between the roller bearings.

2. A stationary load-carrying axle, a tubular wheel-carrying axle, roller bearings between said axles at points near the ends thereof, and rolling thrust bearings between the roller bearings and serving to restrain one axle from moving axially with respect to the other.

3. A tubular axle transversely divided into two sections, a wheel secured to each section, a load-carrying axle extending thru the tubular axle, roller bearings between the two axles at about the places where the wheels are located, and a rolling bearing located between the roller bearings and serving to convey thrust from the load-carrying axle to a wheel on the tubular axle.

4. A tubular axle transversely divided into two sections and each section being composed of two pieces of tubing secured together and so constructed that the outer tubing of one section overlaps the inner tubing of the other section, a stationary axle extending thru the tubular axle, and rolling bearings between the two axles.

5. A tubular axle composed of alined pieces of tubing, wheels secured to the ends of the axle, and an enclosing tubing surrounding the alined pieces and extending from wheel to wheel, said tubing being connected so that it turns with one piece and with respect to the other piece.

6. A tubular axle composed of alined pieces of tubing, wheels secured to the ends of said axle, an enclosing tubing surrounding the alined pieces to retain their alinement and extending from wheel to wheel, an interior axle extending thru the tubular axle, and rolling bearings within the tubular axle serving to hold the alined pieces from axial movement within the enclosing tubing, said rolling bearings being associated with the interior axle in such holding.

7. An interchangeable railway wheel unit comprising a stationary axle having its ends adapted to enter the standard truck box and engage with the parts thereof in the ordinary manner, a tubular axle surrounding the stationary axle, wheels secured to the ends of the tubular axle, rolling bearings between the axles and adjacent to the ends of the tubular axle, thrust rings mounted upon the stationary axle and closing the ends of the tubular axle, and oil pipes located within the truck boxes and secured to the thrust rings to convey oil to the space between the two axles.

8. A tubular axle composed of alined pieces of tubing of substantially the same length, wheels secured to the outer ends of said pieces, an enclosing tubing surrounding the alined pieces and extending from wheel to wheel, and oil-retaining packing within the hubs of the wheels and engaged by the ends of the enclosing tubing.

9. A stationary axle having its ends adapted to enter railway boxes and support a load resting on such boxes, a tubular axle surrounding the stationary axle between the parts which extend into the boxes, rolling bearings between the two axles, closure means between the two axles at the ends of the tubular axle, and an oil pipe located within the box and extending thru a closure to convey lubricant to the space between the two axles.

10. A tubular axle composed of alined pieces of tubing, wheels secured to the outer ends of said pieces, an enclosing tubing extending from wheel to wheel and fitting upon the alined pieces to hold them in alinement, packing connections between the ends of the enclosing tubing and the wheels, and an interior connection serving to hold said pieces from longitudinal displacement in the enclosing tubing.

ABRAM C. WISNER.
CASPER L. REDFIELD.